(12) United States Patent
Hansen et al.

(10) Patent No.: US 12,745,037 B2
(45) Date of Patent: Sep. 22, 2026

(54) DIFFERENTIAL AUDIO DATA COMPENSATION

(71) Applicant: EPOS Group A/S, Ballerup (DK)

(72) Inventors: Anders Røser Hansen, Ballerup (DK); Stig Petri, Ballerup (DK); Svend Feldt, Ballerup (DK); Poul Peder Hestbek, Ballerup (DK); Casper Fynsk, Ballerup (DK); Mirjana Adnadjevic, Ballerup (DK)

(73) Assignee: EPOS GROUP A/S, Bellerup (DK)

( * ) Notice: Subject to any disclaimer, the term of this patent is extended or adjusted under 35 U.S.C. 154(b) by 208 days.

(21) Appl. No.: 18/776,715

(22) Filed: Jul. 18, 2024

(65) Prior Publication Data

US 2024/0373164 A1 Nov. 7, 2024

Related U.S. Application Data

(60) Continuation of application No. 18/323,579, filed on May 25, 2023, now Pat. No. 12,069,450, which is a (Continued)

(30) Foreign Application Priority Data

Jul. 20, 2020 (EP) .................................... 20186704

(51) Int. Cl.
*H04R 3/02* (2006.01)
*G10K 11/178* (2006.01)
(Continued)

(52) U.S. Cl.
CPC ......... *H04R 3/02* (2013.01); *G10K 11/17854* (2018.01); *H04M 1/6033* (2013.01); *H04R 1/02* (2013.01)

(58) Field of Classification Search
CPC ...... H04R 3/005; H04R 1/406; H04R 29/006; H04M 9/082; H04M 3/002;
(Continued)

(56) References Cited

U.S. PATENT DOCUMENTS 5,121,426 A 6/1992 Baumhauer, Jr. et al.
2012/0253798 A1 10/2012 Walters et al.
(Continued)

OTHER PUBLICATIONS

Extended European Search Report for European Application No. 21186421.0, dated Nov. 26, 2021.

*Primary Examiner* — Kile O Blair
(74) *Attorney, Agent, or Firm* — Michael Best & Friedrich LLP

(57) ABSTRACT

A method is disclosed, the method comprising obtaining at least one first information indicative of audio data gathered by at least one first microphone, and at least one second information indicative of audio data gathered by at least one second microphone; determining a differential information indicative of one or more differences between at least two pieces of information, wherein the differential information is determined based, at least in part, on the at least one first information and the at least one second information; and compensating of an impact onto the audio data, wherein audio data of the first information and/or the second information is compensated based, at least in part, on the determined differential information. Further, an apparatus, and a system are disclosed.

16 Claims, 6 Drawing Sheets

Related U.S. Application Data division of application No. 17/380,987, filed on Jul. 20, 2021, now Pat. No. 11,700,485.

(51) Int. Cl.
*H04M 1/60* (2006.01)
*H04R 1/02* (2006.01)

(58) Field of Classification Search
CPC ....... G10L 2021/02082; G10L 21/0208; G10L 2021/02166; G10L 21/0232
See application file for complete search history.

(56) References Cited

U.S. PATENT DOCUMENTS

| | | | | |
|---|---|---|---|---|
| 2013/0343571 | A1 | 12/2013 | Rayala et al. | |
| 2017/0187854 | A1 | 6/2017 | Rung et al. | |
| 2018/0027125 | A1 | 1/2018 | Petri et al. | |
| 2020/0344543 | A1* | 10/2020 | Taenzer ................. | H04R 1/406 |

* cited by examiner 14
10a
11a
CaC
10b
15a
300
20
11b
CaC
15a'
12
15b
13
Cmp

DIFFERENTIAL AUDIO DATA COMPENSATION

This application is a Continuation Application of copending application Ser. No. 18/323,579, filed May 25, 2023, which is a Divisional of application Ser. No. 17/380,987 filed on Jul. 20, 2021 (now U.S. Pat. No. 11,700,485 issued Jul. 11, 2023), which claims priority under 35 U.S.C. § 119(a) to Application No. 20186704.1, filed in Europe on Jul. 20, 2020, all of which are hereby expressly incorporated by reference into the present application.

The present disclosure relates the field of speakerphones. More particularly, the disclosure relates to an apparatus e.g. for being connected with a speakerphone or being a part of a speakerphone system.

It is known that in speakerphones or speakerphone systems, the echo perceived by a far-end user is the dominating impairment or impact to have a natural conversation. What is played on a speaker unit (e.g. the (loud-) speaker) of the speakerphone is picked up by the microphone and returned to the far-end as echo.

In recently developed audio devices, such as speakerphones, acoustic coupling between speaker and microphone during conversation leads to a decreasing quality of respective audio outputs to the farend user. Therefore, e.g. echo canceller applications have been developed. Such echo canceller applications are usually formed as filter units and configured to avoid an acoustic output signal of the mobile audio device to be transmitted back via the microphone to an external device that is connected with the mobile audio device. Particularly important are echo cancellation applications for closed rooms with hard walls, reverberant rooms, etc, which have the tendency to support long echoes, i.e. rooms where a microphone would be subjected to a high degree of reveberance.

Other known ways of removing or canceling the echo produces unwanted artefacts, such as linear acoustic cancellers. One such example, which is often used in speakerphones of today, is simply to (partially) mute the microphone when the speaker is playing. Despite this being an effective method to remove the echo, it has some drawbacks, e.g. it makes it impossible for the user of the speakerphone to interrupt the far-end speaker, since the system is reduced to a half-duplex/simplex system.

Therefore, there is a need to provide a solution that addresses at least some of the above-mentioned problems. Specifically, there is a need to provide a solution that allows for a cancellation of echo in such speakerphone applications. At least there is a need for providing an alternative to the prior art.

The present disclosure relates at least to an apparatus. The apparatus may be a speakerphone.

The present disclosure provides various methods and apparatuses configured for reducing or eliminating the effect of a local output transducer on closely located input transducers, especially in speakerphones. This is contemplated to reduce an amount of echo in an output signal from such speakerphone during e.g. telephone calls, such as softphone calls or videoconferences.

According to a first exemplary aspect an apparatus is disclosed, the apparatus comprising at least one processor and at least one memory including computer program code, the at least one memory and the computer program code configured to, with the at least one processor, cause the apparatus to at least perform:

obtaining at least one first information indicative of audio data gathered by at least one first microphone, and at least one second information indicative of audio data gathered by at least one second microphone;

determining a differential information indicative of one or more differences between at least two pieces of information, wherein the differential information is determined based, at least in part, on the at least one first information and the at least one second information; and compensating of an impact onto the audio data, wherein audio data of the first information and/or the second information is compensated based, at least in part, on the determined differential information.

The components of the apparatus or the respective apparatus for realizing the above functions may generally be implemented in hardware and/or software. The apparatus may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the apparatus may comprise for instance one or more processing units or processors.

In one example, the apparatus may comprise means for performing and/or controlling the respective functions. The apparatus may, however, also comprise one or more additional components. The apparatus may be configured for being connected with a speakerphone or speakerphone system, and/or configured for being an auxiliary device for a speakerphone or speakerphone system. The apparatus may be an auxiliary device comprised by or being connectable to a speakerphone or speakerphone system.

According to a second exemplary aspect a system is disclosed, the system comprising the apparatus according to the first exemplary aspect and a speakerphone or speakerphone system comprising the at least one first microphone and the at least one second microphone, and a loudspeaker for playing audio information.

The apparatus of the system may be configured for cancelling at least one echo perceivable by a far-end user of the speakerphone or speakerphone system.

According to a third exemplary aspect, a method is disclosed, the method comprising:

obtaining at least one first information indicative of audio data gathered by at least one first microphone;

obtaining at least one second information indicative of audio data gathered by at least one second microphone;

determining a differential information, wherein the differential information is determined based, at least in part, on the at least one first information and the at least one second information; and compensating of an impact onto the audio data, wherein audio data of the first information and/or the second information is compensated based, at least in part, on the determined differential information.

This method may be performed by at least an apparatus of a system according to the second exemplary aspect, and/or by an apparatus according to the first exemplary aspect. Alternatively, this method may be performed by at least an apparatus of a system according to the second exemplary aspect, in particular the apparatus according to the first exemplary aspect comprising the at least one first microphone and the at least one second microphone, and the system or the apparatus comprising a loudspeaker for playing audio information.

According to a fourth exemplary aspect, a computer program code is disclosed, the computer program code, when executed by a processor, causing an apparatus to perform and/or control the actions of the method according to the third aspect.

The computer program may be stored on computer-readable storage medium, in particular a tangible and/or non-transitory medium. The computer readable storage medium could for example be a disk or a memory or the like. The computer program may be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

A computer program (product) comprising instructions which, when the program is executed by a computer, cause the computer to carry out (steps of) the method described above, in the 'detailed description of embodiments' and/or in the claims is furthermore provided by the present application. Obtaining at least one first information indicative of audio data gathered by at least one first microphone, and at least one second information indicative of audio data gathered by at least one second microphone; determining a differential information indicative of one or more differences between at least two pieces of information, wherein the differential information is determined based, at least in part, on the at least one first information and the at least one second information; compensating of an impact; adjusting audio data gathered by the at least one first and/or the at least one second microphone; or a combination thereof may be implemented in such computer program (product)

According to a fifth exemplary aspect, a non-transitory computer readable storage medium is disclosed, in which computer program code is stored, the computer program code when executed by a processor causing at least one apparatus to perform the method according to the third aspect. The computer readable medium includes computer storage media adapted to store a computer program comprising program codes, which when run on a processing system causes the data processing system to perform at least some (such as a majority or all) of the steps of the method described herein and in the claims.

As a further example, the present disclosure provides a speakerphone or speakerphone system, wherein the speakerphone comprises a speakerphone housing, wherein a first input transducer and a second input transducer are arranged in the speakerphone housing, an output transducer arranged in the speakerphone housing, a processor in communication with the first microphone, the second microphone and the output transducer, wherein the processor is configured to receive electrical signals from the first microphone and the second microphone, which electrical signals represent ambient sound received by the first microphone and second microphone respectively, wherein the signal from the first microphone is fed to a first calibration unit configured to provide a first calibrated signal, an adaptive filter configured to receive the first calibrated signal, the signal from the second microphone is fed to a second calibration unit configured to provide a second calibrated signal, wherein the processor is configured to establish a processed signal based on the first calibrated signal and the second calibrated signal, wherein in the processed signal signal contribution from the output transducer is substantially eliminated. The processing performed by the processor may include determining a difference between the first calibrated signal and the second calibrated signal. The adaptive filter may be configured to operate based on the difference between the first calibrated signal and the second calibrated signal. In some situations it may be needed to control the output level of the speaker/output transducer so that the first and/or second microphones does not reach not saturation. The above configuration and processing is contemplated to allow cancelling the output signal from the speaker positioned within the nearfiled, which could include being in the same housing, as the microphones, while picking up sound from a person speaking near the speakerphone, as the person speaker is, relatively, far away, in an improved manner. This is, at least partly, based on an assumption from the so-called inverse square law, where the assumption is that the amplitude difference on the microphones, when a user is speaking, will be insignificant compared to the difference experienced from the speaker to each of the microphones. The processor could be included in the speakerphone housing but could alternatively be located in an external device, such as a computer, video camera device, or other suitable type of device.

An external microphone may be provided, where the external microphone is configured to be in communication with the processor providing the processed sound from the speakerphone. The external microphone may provide an input which could be used to reduce reverberation or other disturbing audio phenomenon from the surroundings of the speakerphone. This could include echo and/or noise.

For the adaptation to succeed in canceling the contribution from the speaker/output transducer, the adaptive filter should incorporate a significant attenuation (to ensure the amplitude of the speaker signal are equal) before subtraction. As the distances between speaker/output transducer and microphones are significantly shorter than the distances from the microphones to the wanted speech source, it can be shown that this array type implements a canceling "point" instead of a canceling plane. The beamformer in this arrangement thus cancel the sound signal from the local output transducer, which is assumed not to be of interest for the speakerphone, i.e. this is referred to as echo, and thus provide an improved pick up of speech from e.g. a person in the room using the speaker phone. In this way, echo's are suppressed or even cancelled, meaning that the farend speaker/user does not perceive the signal from the person using the speakerphone as being distorted by echo.

In such a speakerphone, the microphones may be arranged so that both the microphones and the output transducer together define a straight line or axis going through them in a plane, e.g. in a plane parallel to a top surface of the speakerphone housing. In one instance, the top surface of the speakerphone housing may have a circular circumference, or the top surface of the speakerphone housing may have an elliptically shaped circumference.

The present disclosure provides that, in the speakerphone housing, the first microphone, the second microphone and the output transducer may be arranged on an axis or line when viewed from a top surface of the speakerphone housing. When the components are aligned on an axis, calculations are less complex.

The present discourse provides that, in the speakerphone housing, the first microphone, the second microphone and the output transducer are arranged offset relative to an axis or line when viewed from a top surface of the speakerphone housing, and that the adaptive filter provides an output signal which compensate for the asymmetry in alignment of components. The adaptive properties of the system also allow for overcoming asymmetries, e.g. due to production tolerances, or even deliberate placement of components relative to each other.

One or more suspension mechanism may be included in the speakerphone housing. This could be in a speakerphone where the speakerphone includes a speaker enclosure structure including the speaker. The speaker may be an electromechanical component which in operation generates sound waves by deflection of a speaker membrane and in collaboration with the speaker enclosure structure. The speakerphone housing may include an outer shell of the speakerphone and may accommodate additional electronic components required for operation of the speakerphone or for other purposes. The speaker enclosure structure may be mechanically coupled to the speaker device housing. In some embodiments, the speaker enclosure structure may be mechanically coupled to the speaker device housing by at least one coupling element. The coupling element may have a vibration damping structure configured to inhibit mechanical vibrations being transmitted through the coupling element.

This allows that the transmission of mechanical vibrations from the speaker enclosure structure to the speaker device housing is inhibited. Thereby, rattling and negative influences on electronic devices accommodated in the speaker device housing induced by the speaker and transmitted through the coupling element can be reduced.

Components included in the speakerphone housing may include one or more of: a wireless communication circuitry, one or more antennas for wireless communication, one or more ports for wired communication, such as data communication, a power input port.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

The system may be adapted to establish a communication link between the a speakerphone and the apparatus (e.g. an auxiliary device) to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the apparatus. The function of a remote control is implemented in a smartphone, the smartphone possibly running an APP allowing to control the functionality of the audio processing device via the smartphone (the apparatus comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the apparatus.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

In the following, further exemplary features of all aspects will be described in more detail.

For instance, in a speakerphone or speakerphone system, the echo perceived by a far-end user (e.g. participant of a telephone conference) may be the dominating impairment to have a natural conversation. What is played on the (loud-) speaker of the speakerphone or speakerphone system may be picked up by the at least one first microphone and/or the at least one second and returned to the far-end user e.g. as echo.

The at least one first information may be obtained, e.g. by receiving or triggering provision of at least one first information. The at least one first information may be gathered (e.g. recorded) by the at least one first microphone. The at least one first information is or comprises at least in part a signal. The at least one first information is indicative of audio data gathered (e.g. recorded) by at least one first microphone. The audio data is intended to be provided to the far-end user, e.g. as voice or speech perceivable by the far-end user. By gathering respectively obtaining the at least one first information and the at least one second information, a two channel gathering (e.g. recording) respectively obtaining is enabled.

The at least one second information may be obtained, e.g. by receiving or triggering provision of at least one second information. The at least one second information may be gathered (e.g. recorded) by the at least one second microphone. The at least one second information is or comprises at least in part a signal. The at least one second information is indicative of audio data gathered (e.g. recorded) by at least one second microphone.

The at least one first information and the at least one second information may be gathered (e.g. recorded) simultaneously by the at least one first microphone and the at least one second microphone. The at least one first microphone and/or the at least one second microphone may be comprised by or connectable to the apparatus. In case the at least one first microphone and the at least one second microphone are not comprised by the apparatus, the at least one first information and the at least one second information gathered by the at least one first microphone and the at least one second microphone are provided (e.g. transmitted) to the apparatus so that the apparatus can obtain (e.g. receive) the at least one first information and the at least one second information.

The at least one first microphone and the at least one second microphone may be configured as bidirectional microphones. Alternatively or additionally, the at least one first microphone and the at least one second microphone may be configured as single point cancelers. In case the at least one first microphone and the at least one second microphone are configured as single point cancelers, the at least one first microphone and the at least one second microphone may not be arranged (e.g. placed) equidistant to a source (e.g. speaker or loudspeaker) based on which the at least one first information and the at least one second information are gathered. In case the at least one first microphone and the at least one second microphone are configured as bidirectional configuration, the at least one first microphone and the at least one second microphone are, ideally not necessarily, arranged (e.g. placed) equidistant to such a source. Currently it is preferable that the first microphone and the second microphone are omnidirectional microphones. The combined microphone system comprising the first and the second microphones may be a bidirectional microphone system.

The differential information is indicative of one or more differences between at least two pieces of information. The differential information is determined based, at least in part, on the at least one first information and the at least one second information gathered by the at least one first microphone and the at least one second microphone. In case the at least one first microphone and the at least one second microphone are configured as bidirectional microphones, e.g. arranged equidistant to the source (e.g. loudspeaker with which e.g. the voice of one or more telephone conference participants, thus one or more far-end users, is played back) and/or mirrored on each side of the source, a symmetry line through the source may be formed. This enables to cancel out linear and non-linear part impacting the audio data. Such an impact may be an echo. Such an echo may arise from e.g. the loudspeaker in the device. The microphones may be exited at identical levels thereby working in the same dynamic range and exhibiting close to same distortion. Further, such impact may be distortion, which may arise from mechanical transfer. The latter may be counted e.g. if a mechanical design is made symmetric along the symmetry line, as disclosed above, and is identical on the at least one first microphone and the at least one second microphone. The impact may be compensated, e.g. by determining compensated audio data to be played back, e.g. to the far-end user of a telephone conference, to name but one non-limiting example.

This allows a two channel differential canceller to be enabled.

The at least one first microphone and the at least one second microphone may be arranged having a polar pattern, e.g. a bidirectional pattern, which may effectively cancel any source in its so-called "nulling plane". Such a "nulling plane" as used herein, refers to a direction in a microphone's pattern where the microphone may gather almost no audio data.

For instance, placing of a loudspeaker of the speakerphone or speakerphone system in this "nulling plane" may significantly lower the amount of speaker/output transducer originated audio in the signal from the at least one first microphone and the at least one second microphone, i.e. after processing the input signals from these microphones. However, this might cancel or at least attenuate all other audio data from the same place, including wanted speech, to name but one non-limiting example.

The impact in the audio data may be caused by one or more non-linear components and/or mechanical vibrations (e.g. an echo), wherein the one or more non-linear components and/or mechanical vibrations are, at least in part, compensated by being cancelled, at least in part.

For instance, one way to suppress the impact of echo to the audio data is to use spatial information, e.g. the relationship between the loudspeaker and at least one first microphone and/or the at least one second microphone.

In a single point canceller configuration of the apparatus, e.g. echo may arise from loudspeaker, other degradation sources include non-linearity caused by by the at least one first microphone and/or the at least one second microphone, and/or from mechanical transfer e.g. of vibrations, to name but a few non-limiting examples. By compensating the audio data gathered (e.g. recorded) by the at least one first microphone and the at least one second microphone prior to the transmission to a far-end user, such impact (e.g. echo hearable by the far-end user) can effectively be cancelled without requiring high symmetry arrangement of loudspeaker, and microphone(s) of a respective speakerphone system.

The method may further comprise:

adjusting audio data gathered by the at least one first and/or the at least one second microphone, wherein impacting performance of the at least one first and/or the at least one second microphone are adjusted so that a difference in performance between the at least one first microphone and the at least one second microphone is evened out.

The one or more parameters as used herein may comprise microphone sensitivity, microphone impedance, microphone frequency response, microphone overload, microphone distortion, or a combination thereof, to name but a few non-limiting examples. Adjusting one or more of the parameters may allow to even out a difference (e.g. if any) that may result in a different gathering (e.g. recording) of the audio data between the at least one first microphone and the at least one second microphone to be evened out. Further, this allows that prior to the determining of the differential information, the at least one first information and the at least one second information can be biased. Evening out may be at least partly achieved via a calibration block comprising a respective calibration block for the at least one first microphone and/or the at least one second microphone comprised by the respective apparatus.

The differential information may be determined e.g. by subtracting the at least one first information from the at least one second information, and/or by subtracting the at least one second information from the at least one first information. This may be done by an addition circuit comprised by the respective apparatus. Thus, the determining of the differential information may utilize the at least one addition circuit. Such at least one addition circuit, as used herein, may be configured for subtracting the first information from the second information, or by subtracting the second information from the first information.

Prior to the subtracting, the at least one first microphone and/or the at least one second microphone may be adjusted.

The one or more parameters may be adjusted over according to a current ageing state of the at least one first microphone and/or the at least one second microphone so that e.g. aging impacts causing alteration of audio data gathered (e.g. recorded) by the at least one first microphone and/or the at least one second microphone can be compensated. Ageing may be occurred due to time passing, but may also be brought on by sudden changes such as the device being dropped, which could lead to degradation of components, which potentially have the same effect as aging, i.e. making a component perform worse than originally specified. The methods and devices mentioned herein may be adapted to detect a current state which could represent a state of degradation of one or more components. In this way, calibration and/or matching of the at least one first microphone and/or the at least one second microphone is enabled. The at least one first information and the at least one second information gathered by the at least one first microphone and the at least one second microphone can be gathered with similar microphone performance, the respective microphone performance can be remained the same or at least similar during the lifespan of the apparatus.

The adjusting of the audio data may utilize the at least one calibration circuit configured for adapting the one or more parameters of the at least one first microphone and/or the at least one second microphone. Such at least one calibration circuit may for instance be an adjustment element, e.g. a frequency response calibration circuit, to name but one non-limiting example. Further, adjusting may also benefit from phase calibration of at least one of the at least one first microphone and/or the at least one second microphone, wherein phase calibration may be done by calibration the phase of one microphone to the other. This may be done based, at least in part, on a signal played from the loudspeaker.

The compensating may utilize the at least one compensation circuit. Such at least one calibration circuit may be configured for correcting any unwanted impact on the signal that the bidirectional configuration or single point canceller configuration of the at least one first microphone and the at least one second microphone may have caused. Depending on the physical speaker-microphone placement of a respective speakerphone, the resulting pattern may not necessarily be bidirectional. Also, such a pattern may be unidirectional, wherein a single point canceller configuration may enable to compensate unwanted impact influencing the audio data gathered by the at least one first microphone and the at least one second microphone.

The loudspeaker may be a speaker unit or be comprised by such a speaker unit. The loudspeaker may be for playing audio information. For instance, the audio information may be gathered by the at least one first microphone and/or the at least one second microphone enabling audio data to be transmitted to a far-end user to be compensated enabling the far-end user to experience the audio data e.g. without unwanted impact (e.g. echo) perceivable.

In this way, the apparatus according to the first exemplary aspect may be configured for cancelling at least one echo perceivable by a far-end user of a respective speakerphone.

The features shall be considered to be disclosed in any combination with each other. Further, the disclosure of any means for performing a method step shall be understood to also disclose the respective method step and the disclosure of a method step shall be understood to also disclose respective means for performing the step.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figures 1A, 1B:
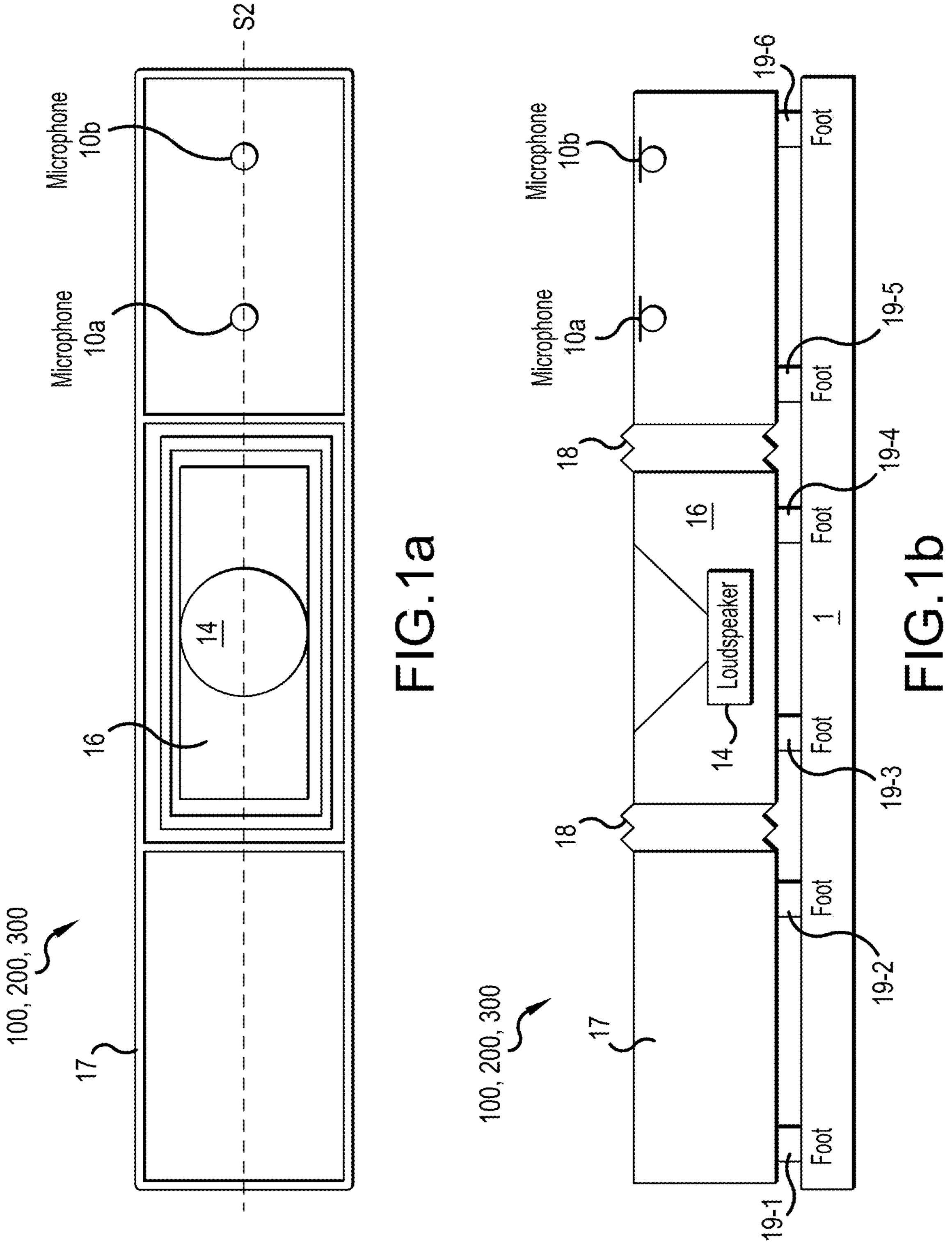
FIG. 1A illustrates a speakerphone system according to all exemplary aspects in a top view.
FIG. 1B illustrates the speakerphone system according to FIG. 1A in a sectional view.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A speakerphone or speakerphone system may be or include an apparatus according to the first exemplary aspect that is adapted to improve or augment the hearing capability to a far-end user receiving an acoustic signal (e.g. audio data). 'Improving or augmenting the hearing capability of a far-end user' may include compensating audio data. The "speakerphone" may further refer to a device such as a conference telephone, an earphone or a headset adapted to receive audio data electronically, possibly compensating the audio data and providing the possibly compensated audio data as an audible signal to at least one of the user's ears. Such audio data may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

A speakerphone or speakerphone system (e.g. also referred to as hearing system herein) may refer to a system comprising at least one apparatus according to the first exemplary aspect, e.g. comprising at least two microphones where the respective devices are adapted to cooperatively provide audio data to e.g. a far-end user's ears and/or a device at least according to the further example. A speakerphone or speaker phone system comprises at least a speakerphone housing, an output transducer/speaker and an input system comprising a first and a second microphone.

The speakerphone or speakerphone system may be configured to communicate with one or more further auxiliary device(s) that communicates with the at least one apparatus, the auxiliary device affecting the operation of the at least one apparatus and/or benefitting from the functioning of the at least one apparatus. A wired or wireless communication link between the at least one at least one apparatus and the auxiliary device may be established that allows for exchanging information (e.g. control and status signals, possibly audio signals and/or audio data) between the at least one apparatus and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a speakerphone or speakerphone system includes i) an input unit such as a microphone for receiving audio data (e.g. an acoustic signal from a user's surroundings and providing a corresponding input audio signal, and/or ii) a receiving unit for electronically receiving an input audio data. The speakerphone or speakerphone system further includes a signal processing unit for processing the input audio signal and an output unit for providing an audible signal to the user in dependence on the compensated audio signal.

The input unit may include multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc.

For decades, the "ideal" business meeting was one in which all participants were physically present in the room at the same time. This enabled attendees to easily present ideas, ask questions, exchange information and receive feedback.

Of course, it isn't always practical—or even advisable today—to gather all meeting participants in a single room. In addition, as business has become increasingly global and technology more robust, many business meetings are now conducted via videoconference, with the aid of speakerphones.

To ensure the best possible meeting, speakerphones need to accurately reproduce the experience of being physically present with other call participants. Among the most important activities they need to replicate is double-talk. A natural part of conversation, double-talk occurs when people on opposite sides of a digital call interrupt, question or comment on each other's statements mid-sentence, thus speaking simultaneously.

The Technical Challenge of Enabling Double-Talk

While double-talk occurs easily when all participants are physically present in a room, replicating this activity can be a difficult technical challenge for many communication devices—and speakerphones in particular.

This is because speakerphones are, by design, open audio systems that include a loudspeaker and microphone (or series of microphones) that are fully open to the air. While this has the advantage of enabling many attendees to be present on a call, it can also create an unwanted side effect: Echo, which occurs when sound from the loudspeaker is picked up by the microphone and looped back to the speaker at the far end.

The Many Causes of Echo

While audio waves that travel from a speakerphone's loudspeaker to its microphone is the most common cause of echo, it is far from the only one. Echo can have many causes, and, in fact, many factors can occur simultaneously to create echo situations.

The design and construction of the speakerphone can be major contributors to echo. Poorly designed devices, or ones built using low-quality materials and components, enable audio waves to immediately reach the microphone as vibrations that pass through the body of the speakerphone, causing echo.

The size and layout of a speakerphone can also cause echo. In general, the chance of creating an echo increases as the distance between loudspeaker and microphone decreases, because the audio waves have a shorter path to travel. Small speakerphones can be particularly susceptible to echo because their compact design limits the available space between loudspeaker and microphone.

The local sound environment, such as the conference room in which the call is being conducted, also plays a role in creating echo. Audio waves from the loudspeaker naturally reflect off walls, open laptop screens and other objects, including people, within a conference room. Because sound passes through or reflects off these surfaces at different speeds, these signals can arrive at the microphone at different times—with structure-bound waves arriving immediately and airborne arriving a millisecond later.

Strategies for Controlling Echo

With all the ways echo can present itself, how do we eliminate it from speakerphone calls? That's a question that audio engineers have grappled with for decades and are still working to perfect. It's important to note that echo is an ever-changing sound artifact that constantly appears in new shapes and forms. In reality, echo cannot be eliminated altogether using current technologies; however, it can be controlled—and, in many cases, controlled highly effectively.

Strategies for mitigating echo include everything from speakerphone design, construction and materials to employing highly advanced echo-cancellation features.

Concert Hall Vs. Library: Quantifying the Echo-Cancelling Challenge

Cancelling echo from speakerphones is a major task. How big? Essentially the equivalent of reducing the volume of a very loud rock concert to that of a quiet library.

The loudest sound on a speakerphone occurs at the rim of the loudspeaker and has a sound pressure level (SPL) of approximately 115-125 dB. This SPL should be reduced to approximately 35 dB to be "drowned" by the microphone self-noise and thus unlikely to produce an echo.

Controlling Echo Through Design

The first step in controlling speakerphone echo begins with thoughtful hardware design and relentless attention to detail. Everything from the physical design of the device to the quality of materials used in construction plays a role in reducing echo, enabling natural conversation and creating an outstanding meeting experience. This is however not the main focus of the present disclosure.

Some acoustic design considerations include:

Intelligent chassis design. No detail is too small when it comes to the physical design of speakerphones. For instance, the loudspeaker system may be isolated from the rest of the chassis to avoid transferring sound from the loudspeaker to the microphones through chassis vibrations.

Optimal speaker location. Because the risk of echo increases the closer the loudspeaker is to the microphone, the positions the microphone array as far away from the loudspeaker as possible to minimize the risk of echo.

Performance-quality components. The highest quality speakers and microphones are components that are linear and offer a flat, predictable frequency response, which helps minimize "surprise" sounds that can often cause echo.

The present disclosure mainly relate to controlling echo through signal processing.

Because echo comes in various forms and can originate from many sources, outstanding speakerphone design alone isn't enough to fully control it. Thus, audio engineers employ an array of digital signal-processing strategies—ranging from the basic to the highly advanced—to identify and mitigate sources of echo.

In general, most echo-cancelling strategies seek to compare the microphone signal with the loudspeaker signal and then "purify" the microphone signal by removing all sound components coming from the loudspeaker.

An overview of signal processing strategies includes:

Microphone Disabling

The most rudimentary echo-cancelling system—and one used in some lesser-grade speakerphones—works by automatically muting the microphone on the receiving speakerphone while the person on the speaking end is talking. When an algorithm in the speakerphone senses a signal at the loudspeaker, which indicates the other person is talking, it shuts down the microphone on the receiving side, eliminating any unwanted sounds and the possibility of echo. When the system recognizes an absence of signal at the speaker, it enables the microphone on the receiving side, allowing that person to then respond.

The biggest drawback to this echo-cancelling strategy is that it doesn't allow double-talk. Without the ability for one person to interrupt or acknowledge the other mid-sentence or both to speak at the same time, this method doesn't lend itself to natural conversation or a positive user experience.

Use of Adaptive Microphone Pick-Up Patterns

A much more advanced echo-cancelling strategy incorporates directional microphones into the speakerphone design. Rather than completely turning off the receiving microphone when a signal is present at the loudspeaker, an algorithm instead shifts the microphone from omnidirectional mode to a directional pick-up pattern pointing away from the loudspeaker, thus minimizing the audio traveling from loudspeaker to microphone. When the system recognizes an absence of signal at the loudspeaker, it shifts the microphone back to omnidirectional mode, constantly ensuring optimal double-talk performance.

Delaying and Subtracting Loudspeaker Signal from Microphone Signal

This strategy employs several advanced signal-processing techniques to negate the slight leakage from the loudspeaker to the microphone, which occurs regardless of the quality of the microphone's pick-up pattern. The loudspeaker signal is looped back to the microphone signal path—and then delayed and inverted—to cancel any residual airborne loudspeaker signal that may have leaked into the microphone. This advanced process of inverting and phase delaying a signal and combining it with the original can be highly effective at promoting double-talk and eliminating the risk of echo.

Advanced Echo-Cancelling

While a combination of the echo-cancelling strategies discussed previously can be effective in controlling echo when using speakerphones, an advanced echo-cancellation system has been developed This ultra-high-performance system may include a combination of linear and non-linear signal processing that constantly measures, estimates and updates itself based on thousands of pre-defined parameters. Combined with a state-of-the-art microphone array that effectively separates human voice from other extraneous audio, a system according to the present disclosure may ensure high-quality sound and a natural meeting experience without disturbing sound artifacts.

Some of the components of this system may include:

Reference disturbance signal—Emulates the loudspeaker signal that potentially can cause echo. When the signal is played through the loudspeaker at different volume levels it will become more or less distorted depending on the level. This feature estimates the disturbance signal as accurately as possible to filter it out effectively.

Spatial environment analysis—Analyzes the meeting room and identifies possible spatial changes during the meeting, such as a person moving closer to the microphones or people entering the room.

Adaption and removal—Constantly adapts to the changing environment and removes the disturbance signal.

Preferably, speakerphones should be able to reproduce the experience of being physically present with other call participants to ensure a natural speaking and meeting environment.

Among the most important activities speakerphones need to replicate is double-talk, which occurs when people on opposite sides of a digital call speak simultaneously. For speakerphones, replicating this activity can be technically difficult because of the risk of echo, which often results when an audio signal from the loudspeaker travels back to the microphone and is then transmitted back to the person speaking.

Echo is a continually changing sound artifact that can never be fully eliminated, but it can be controlled through superior design and materials as well as several advanced echo-cancelling strategies.

Why are Speakerphones Prone to Echo, but Headsets Aren't?

While speakerphones are susceptible to echo, headsets are largely impervious to it. Why? A couple reasons. For starters, speakerphones need to play at a higher volume than headsets, which increases the chance of echo. In addition, unlike speakerphones, which are open audio systems, headsets are largely closed audio systems. The foam padding around the ears prevents audio waves from escaping and being picked up by the microphone—and thus causing an unwanted echo.

Now referring to FIG. 1A and FIG. 1B, which illustrates a speakerphone system 100, 200, 300 e.g. for compensating echo. FIG. 1A shows the speakerphone system 100, 200, 300 according to all exemplary aspects in a top view. FIG. 1B shows the speakerphone system 100, 200, 300 according to all exemplary aspects in a sectional view.

The speakerphone system 100, 200, 300 comprises a speakerphone housing or chassis 17. Within the speakerphone chassis 17, a speaker chamber 16 is arranged. The speaker chamber 16 is configured to receive a speaker unit, e.g. a loudspeaker 14, e.g. to playback audio information provided by a far-end user e.g. to one or more users or participants of a telephone conference utilizing the speakerphone system 100, 200, 300. Further, the speakerphone system 100, 200, 300 comprises at least two microphones, at present a first microphone 10*a* and a second microphone 10*b*. The first microphone 10*a* and the second microphone 10*b* are arranged at a microphone chamber of the speakerphone system 100, 200, 300. The first microphone 10*a* and the second microphone 10*b* are arranged along a symmetry line SL extending along a longitudinal direction of the speakerphone system 100, 200, 300. The speakerphone system 100, 200, 300 is configured to perform and/or control a method according to all exemplary aspects. The speakerphone system 100, 200, 300 may comprise or be, at least a part of it, the apparatus according to the first exemplary aspect.

As illustrated in the sectional view of FIG. 1B, between the microphone chamber and the speaker chamber 16, and additionally, between the speaker chamber 16 and a third chamber of the left of the speakerphone chassis 17, suspension 18 is arranged, e.g. for dampening of mechanical transfer of vibrations from one chamber to another of the speakerphone system 100, 200, 300. In particular, one or more vibrations caused by the loudspeaker 14 of the speaker chamber 16 potentially be transferred to the chamber of the first microphone 10*a* and the second microphone 10*b* are reduced or avoided. Further, the speakerphone system 100, 200, 300 comprises several foot 19-1 to 19-6, and additionally further foot not illustrated due to the sectional view of FIG. 1B. The foot 19-1 to 19-6 may further reduce distortion gatherable be the first microphone 10*a* and the second microphone 10*b*, e.g. by decoupling the speakerphone system 100, 200, 300 from a setting on which it is placed. Here, the speakerphone system 100, 200, 300 is placed on a table, or ground, or floor 1.

The first microphone 10*a* and the second microphone 10*b* may be configured as respective bidirectional microphones. Such a bidirectional microphone has a polar pattern as illustrated in the bidirectional microphone polar plot 2 of FIG. 2. In the polar plot 2, two capture directional respectively pickup patterns 2*a*, and 2*b* of a respective bidirectional microphone is shown. Audio data arriving from such directions can be gathered (e.g. recorded) by a respective bidirectional microphone. Thus, such a bidirectional microphone is configured to pick up audio data arriving from mainly two directions. Further, it is illustrated in the polar plot 2 that a so-called "nulling plane" 2*c* is present. In the nulling plane 2*c*, effectively any source is cancelled. By placing a speaker, e.g. loudspeaker 14 of a speakerphone system 100, 200, 300 of FIG. 1A, 1B in such a nulling plane of a respective microphone (e.g. first microphone 10*a* and/or second microphone 10*b* of FIG. 1A, 1B), the amount of speaker originated audio can be significantly lowered or cancelled. However, all sources in that nulling plane 2*c* are cancelled, including wanted speech, to name but one non-limiting example.

Figure 3:
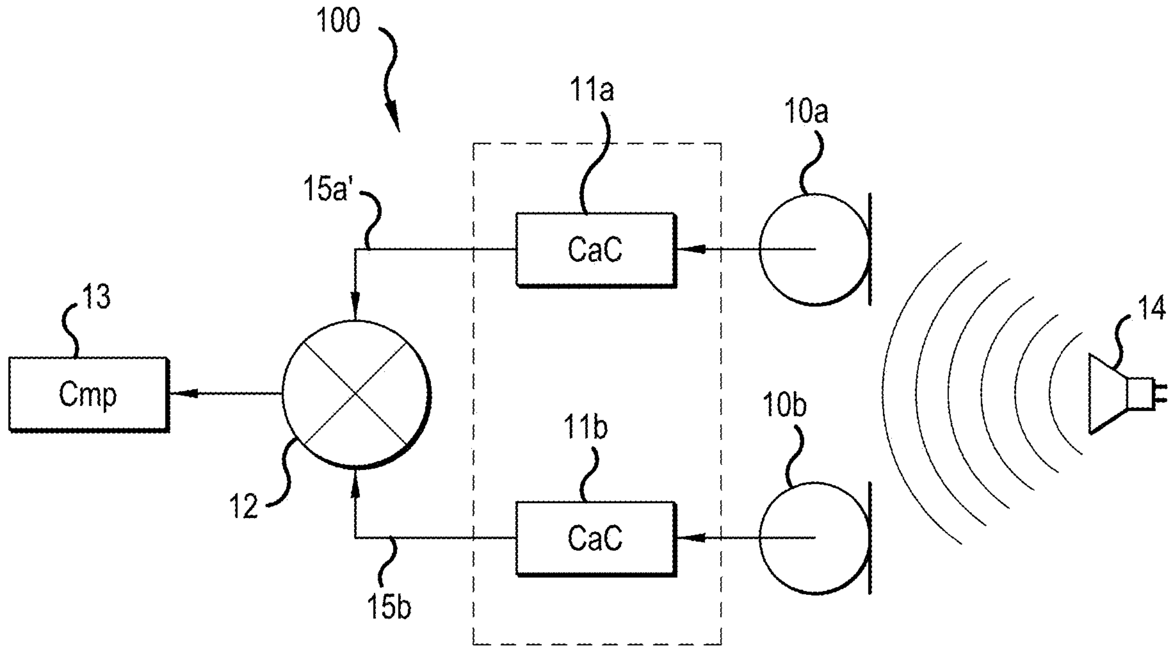
FIG. 3 illustrates a schematic block diagram of a speakerphone system according to all exemplary aspects.

Now referring to FIG. 3, which illustrates a schematic block diagram of a speakerphone system according to all exemplary aspects. An example embodiment may be a two-channel differential echo canceller system, such as the system 100 shown in FIG. 3. The system 100 is configured for cancelling (e.g. suppressing) echo by using bidirectional microphones 10*a*, 10*b*. Further, digital signal processing e.g. to compensate audio data, as disclosed above, may be used. The system 100 comprises, two microphones 10*a*, 10*b*, a calibration block comprising two calibration circuits 11*a*, 11*b* ("CaC"), which is configured to adjust at least one of the microphones 10*a*, 10*b*, e.g. to make the microphones 10*a*, 10*b* equal, or at least similar. The microphone(s) 10*a*, 10*b* gather (e.g. record) audio data stemming from the loudspeaker 14 comprised by the system 100. This calibration block comprising the two calibration circuits 11*a*, 11*b* may be omitted at the cost of performance or simply because of the two microphones 10*a*, 10*b* being equal or very similar. However, to ensure good performate, i.e. high attenuation of the output transducer/loudspeaker 14, the signals should be calibrated so that the signals from the respective microphones have substantially similar frequency responses. Further, in this case it may be beneficial if the two microphones 10*a*, 10*b* have the same or similar age due to one or more parameters of the two microphones changes over the lifespan of the respective microphone 10*a*, 10*b*. Further, the system 100 comprises an addition circuit 12 that subtracts the signals 15*a*, 15*b* from the first and second microphone 10*a*, 10*b* from one another. Further, the system 100 comprises a compensation circuit 13 ("Cmp") that correct any unwanted impact on the audio data (e.g. signals 15*a*, 15*b*) that the (e.g. bidirectional) microphone(s) 10*a*, 10*b* has caused. The system illustrated in FIG. 3 performs best when the microphones are located symmetrically with respect to the loudspeaker, and asymmetry will result in degradation in performance.

Figure 4:
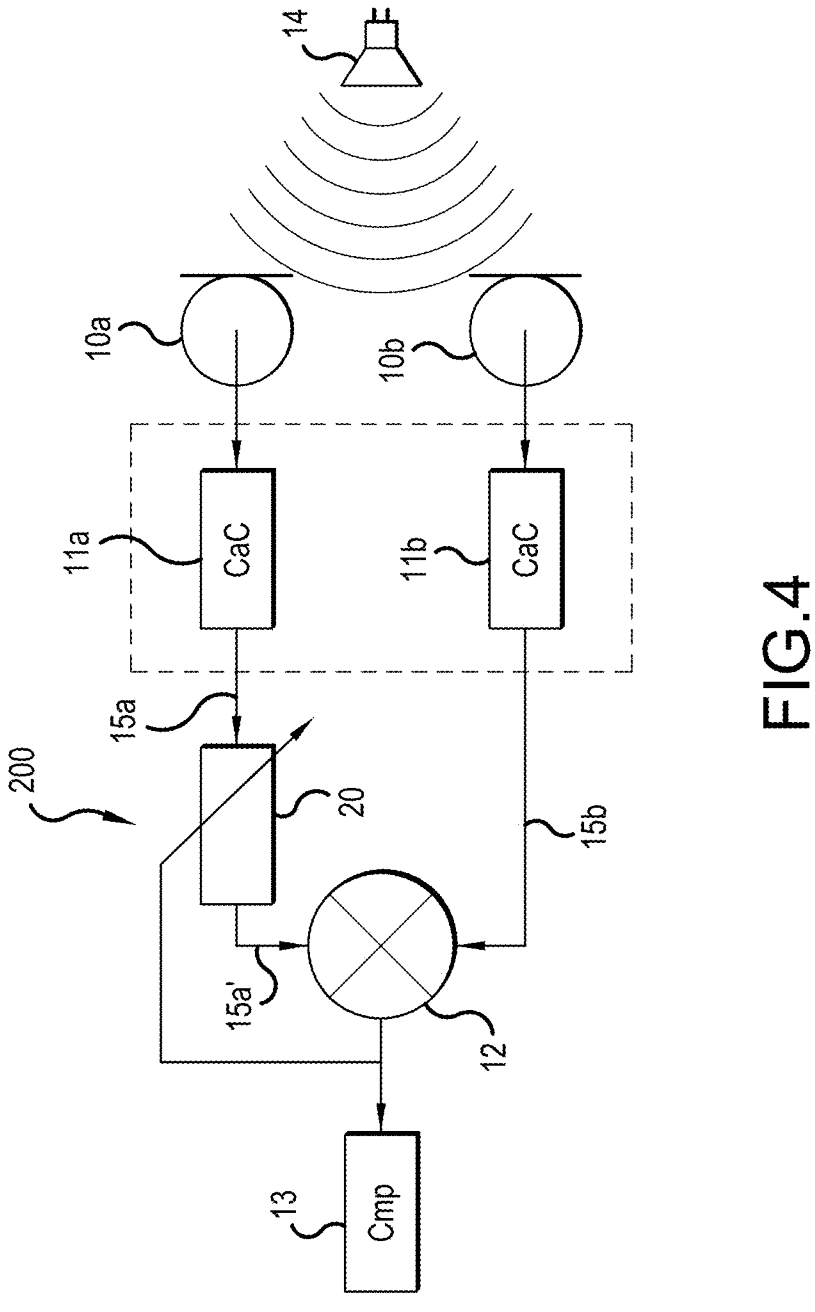
FIG. 4 illustrates another schematic block diagram of a speakerphone system according to all exemplary aspects.

Now referring to FIG. 4, which illustrates another schematic block diagram of a speakerphone system according to all exemplary aspects. An example embodiment may be the (e.g. hearing) system 200 configured for cancelling (e.g. suppressing) echo by using an adaptive arrangement of two bidirectional microphones 10*a*, 10*b*. This system 200 allows a calibration or matching of the two microphones 10*a*, 10*b*, and optionally further acoustics not shown in FIG. 4. The system 200 may benefit in case the two microphones 10*a*, 10*b* are i) produced with similar microphone performance, and ii) remain the same as such during the lifespan of the respective microphone 10*a*, 10*b*.

In FIG. 4, the blocks schematically illustrates an implementation of an adaptive Bi-DIR. Relatively to FIG. 4, a block has been added that is configured to manipulate the amplitude and/or phase of one of the microphones before subtraction. This could be a filter. The filter optimization could be a steepest decent-like algorithm, but the method for optimization is not important. The optimization should minimize the energy at the output of the subtraction when the speaker is playing. This is contemplated to effectively adjust the filter to a solution very similar to the method illustrated above, but would be capable of modeling imperfections in microphone calibration and surrounding acoustics, i.e. perform superior to the other method.

There could be other conditions for adaption than the active speaker/loudspeaker. Another situation is during double talk, here the loudspeaker will be playing, while the person using the speakerphone is talking as well. The microphones will pick up both signals. The goal of the speakerphone is to cancel the loudspeaker signal and convey the user's speech, but it is important to realize that the user's speech in this situation is considered noise to the adaption algorithm. Hence stopping or slowing down adaption during double talk is most likely needed.

In FIG. 4 the calibration circuit is maintained but could be omitted. It might be worth doing an initial calibration at production to ensure not to use the adaptive filters complexity on trivial tasks but to "save" it for more complex tasks as acoustics and ageing.

The method disclosed in reaction to FIG. 4 will as the method disclosed in relation to FIG. 3 reduce the audio energy picked up on the entire plane of symmetry—the plane perpendicular to the plane defined by the two microphones and the speaker and maintains the symmetry of the microphones.

System 200 comprises an adjustment element 20 which has been added to the system 200 in comparison to the system 100 of FIG. 3. The adjustment element 20 may adjust a signal 15*a* from one of the microphones, here microphone 10*a*, before subtraction in the addition circuit 12 (also referred to as subtraction unit). In an example embodiment, the adjustment element 20 may be or be represented by a filter. Optimization may be done in a way minimizing an output of the addition circuit (e.g. the performed and/or controlled subtraction of the signals 15*a*, 15*b*)—e.g. when the conditions are right for the respective adaptation. To name but one non-limiting example, a respective condition may be that the loudspeaker 14 is playing back audio data, e.g. provided by a far-end user to the speakerphone system 200.

The calibration circuits 11*a*, 11*b* are maintained in comparison to the system 100 of FIG. 3, but could also be omitted since the adjustment element 20 may set one or more parameters of at least one of the microphones 10*a*, 10*b* to one another so that the two microphones have equal or similar parameters. In this way, bias of a first information and a second information gathered by the respective two microphones 10*a*, 10*b* can be evened out. In example embodiment, an initial calibration of the two microphones 10*a*, 10*b* may be performed, e.g. at production of the speakerphone system 200.

Figure 2:
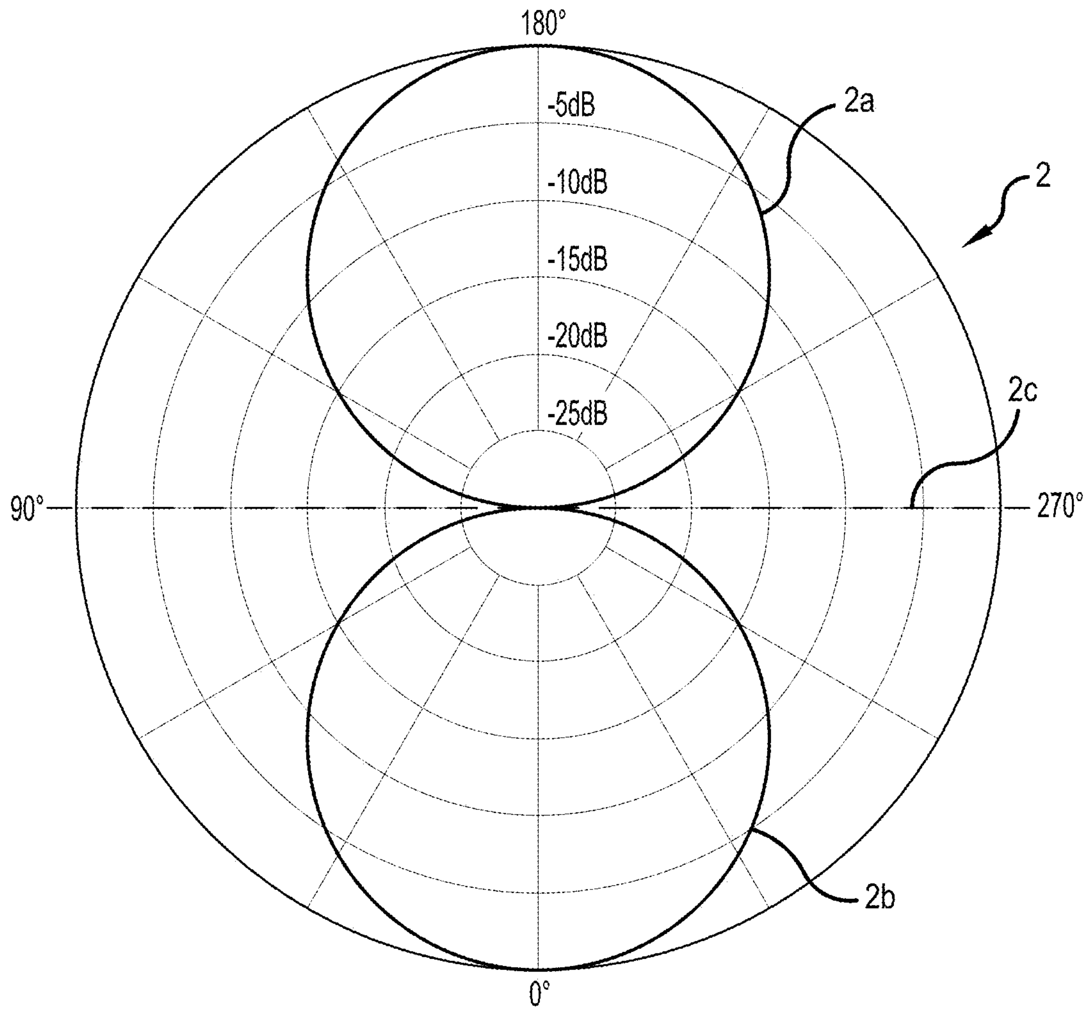
FIG. 2 illustrates a bidirectional microphone polar plot.
Figure 5:
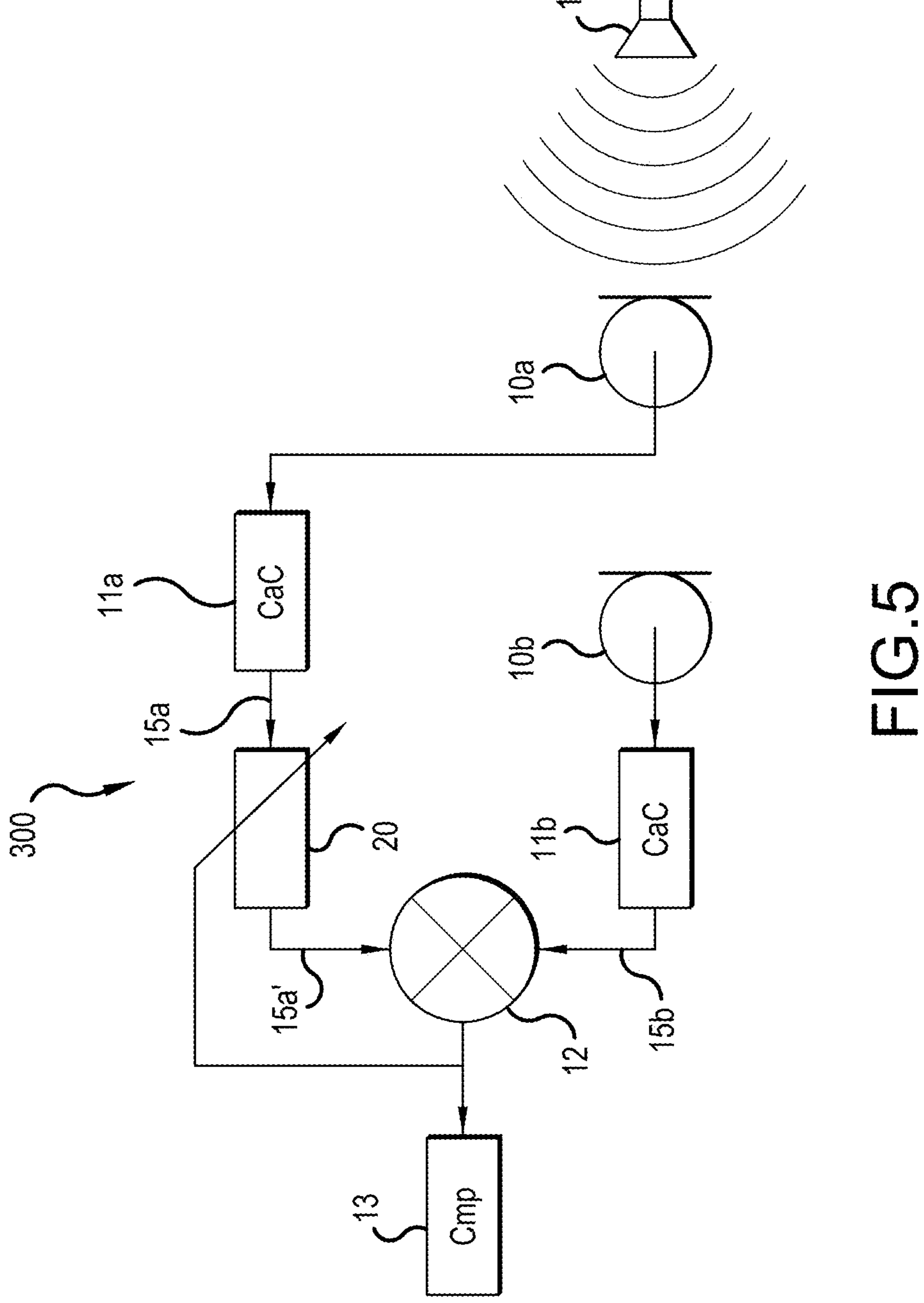
FIG. 5 illustrates yet another schematic block diagram of a speakerphone system according to all exemplary aspects.

Now referring to FIG. 5, which illustrates illustrates yet another schematic block diagram of a speakerphone system according to all exemplary aspects. An example embodiment may be the system 300 which is configured for cancelling (e.g. suppressing) echo by using an adaptive difference canceller arrangement of the two (e.g. bidirectional) microphones 10*a*, 10*b* comprised by the system 300. This system 300 differs from the systems 100 of FIG. 3, and the system 200 of FIG. 4, disclosed above, in that the system 300 is configured to cancel an entire plane of a polar pattern of the respective microphones 10*a*, 10*b*, e.g. a nulling plane as shown in FIG. 2. Further, the system 300 may extend to significant range of planes, e.g. due to the shape of the polar plot enabled by the system 300. Effective cancelling angles could be significant (e.g. compared to a full 360° of possible cancelling angles).

A method to compensate for having reduced pickup of sound in a plane of symmetry as explained above, is to physically rearrange the microphones in relation to the speaker. This is shown in FIG. 5. It can be seen here that the microphones now are positioned in a line from the speaker. The microphone closest to the speaker will receive a significantly higher signal than the second microphone. This is true because we are in the acoustic nearfield of a source (the speaker). This is usually called "The inverse square law". This states that the energy is reduced with the square of the distance. When being very close to the source the impact of this is significant which is exploited in the method disclosed in relation to FIG. 5.

In the configuration illustrated in FIG. 5, the users in the room with the speakerphone are considered to be "far away" from the microphones (compared to the speakers) and due to the inverse square law, the amplitude difference on the microphones will be insignificant compared to the difference experienced from the speaker.

The circuitry of FIG. 4 and FIG. 5 are basically similar, however, the microphones are rearranged in relations to each other and the speaker. One important note is, that when moving the microphone closer to the speaker it is important to safeguard against saturation of the microphone.

For the adaptation to perform well in canceling the contribution from the speaker, the adaptive filter should incorporate a significant attenuation (to ensure the amplitude of the speaker signal are equal) before subtraction. As the distances between speaker and microphones are significantly lower than the distances to the wanted speech, it can be shown that this array type implements a canceling "point" instead of a canceling plane as above. In literature this is sometimes referred to as a nearfield beamformer, however, in this context, the configuration is used as a near field beamformer to cancel the speaker signal in a speakerphone application, which is not the common use. The present disclosure comprises moving one of the microphones very close to the speaker, which is counter intuitive as you move the microphone closer to the acoustic source you wish to remove or eliminate from your microphone signal.

FIG. 5 could also be described as a speakerphone or speakerphone system 300, wherein the speakerphone 300 comprises a speakerphone housing. A first input transducer 10*a* and a second input transducer 10*b* are arranged in the speakerphone housing. An output transducer 14 is arranged in the speakerphone housing. A processor is arranged in communication with the first microphone 10*a*, the second microphone 10*b* and the output transducer 14, wherein the processor is configured to receive electrical signals from the first microphone 10*a* and the second microphone 10*b*, which electrical signals represent ambient sound received by the first microphone 10*a* and second microphone 10*b* respectively. The respective signal from the first microphone 10*a* is fed to a first calibration unit 11*a* configured to provide a first calibrated signal. An adaptive filter 20 is configured to receive the first calibrated signal. The signal from the second microphone 10*b* is fed to a second calibration unit 11*b* configured to provide a second calibrated signal. The processor is configured to establish a processed signal based on the first calibrated signal and the second calibrated signal. In the processed signal, the signal contributions from the output transducer 14 is substantially eliminated or reduced. The processing performed by the processor may include determining a difference 12 between the first calibrated signal 15*a* and the second calibrated signal 15*b*. The adaptive filter may be configured to operate based on the difference between the first calibrated signal and the second calibrated signal The two microphones 10*a*, 10*b* of the system 300 are re-arranged (in comparison to the two respective microphones as utilized by system 100 of FIG. 3, and system 200 of FIG. 4) in relation to the loudspeaker 14. The two microphones 10*a*, 10*b* are positioned in line SL (e.g. see FIG. 1A) with the loudspeaker 14. The microphone 10*a*, which is the closest to the loudspeaker 14, will receive a significantly higher signal (represented by a respective first or second information gathered by the microphone 10*a*) than the second microphone 10*b*, which is arranged (e.g. placed) behind the first microphone 10*a* in relation to the loudspeaker 14 along the line SL. Hence for the adaptation to succeed in cancelling the impact (e.g. contribution) from the loudspeaker 14, an adaptive filter 20 enabling calibration (or a respective calibration circuit, e.g. 11*a*, 11*b* of system 100 of FIG. 3, and/or system 200 of FIG. 4) may incorporate a significant attenuation. As the distances between the loudspeaker 14 and the two microphones 10*a*, 10*b* are significantly lower than the distances to the wanted speech, a cancelling "point" of such an array type is significantly reduced compared to the arrangement/systems 100, 200, as shown in FIG. 3 and FIG. 4, where the plane in principle may be extended indefinitely. The arrangement of microphones as shown in FIG. 1A, 1B, and processing (e.g. compensating audio data, as disclosed above) may enable that i) the far field polar plot of the arrangement shown of the system 300 of FIG. 5 approximates a "omni-directional plot pattern" in which audio data arriving from all directions (3600 circle of a respective polar plot) can be gathered (e.g. recorded). Thus, cancelling within a nulling plane (see nulling plane 2*c* of FIG. 2) may not be present. Instead of such a "nulling plane", system 300 may allow to have a "nulling point".

Figure 6:
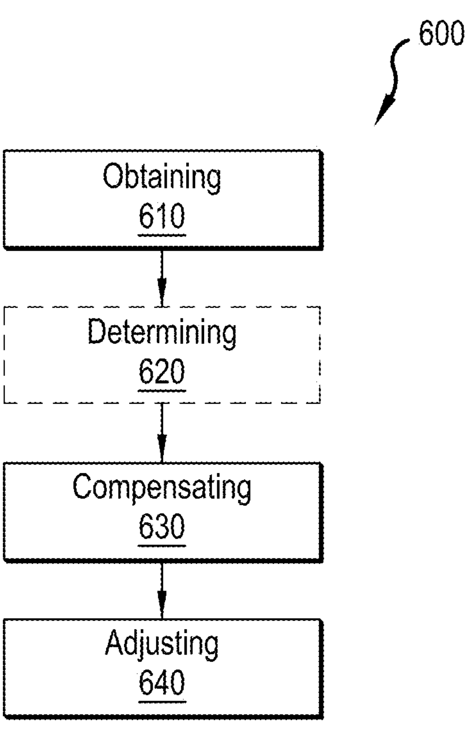
FIG. 6 illustrates a flowchart of a method according to all exemplary aspects.

FIG. 6 illustrates a flowchart 600 of a method according to all exemplary aspects. Flowchart 600 may be performed and/or controlled by the apparatus according to the first exemplary aspect. Alternatively, the flowchart 600 may be performed and/or controlled by the system (e.g. system 100, 200, 300 of FIG. 3, FIG. 4, and/or FIG. 5; and/or speakerphone as illustrated in FIG. 1A, 1B) according to the second exemplary aspect.

In a first step 610, the at least one first information and the at least one second information are obtained, e.g. by receiving the at least one first information and the at least one second information from a first microphone (e.g. microphone 10*a*), and from a second microphone (e.g. microphone 10*b*).

In a second step 620, a differential information is determined. The differential information is determined based, at least in part, on the at least one first information and the at least one second information obtained in step 610.

In a third step 630, an impact onto audio data, wherein audio data is represented or comprised by the first information and/or the second information is compensated. The compensating may be performed and/or controlled based, at least in part, on the determined differential information of step 620.

In a fourth step 640, audio data gathered by the at least one first (e.g. microphone 10*a*) and/or the at least one second microphone (e.g. microphone 10*b*) is adjusted. One or more parameters at least one first (e.g. microphone 10*a*) and/or the at least one second microphone that may impact a respective performance of the at least one first and/or the at least one second microphone are adjusted. This allows e.g. that a difference in performance between the at least one first microphone and the at least one second microphone may be evened out.

The present disclosure also relate to at least the following item:

An apparatus comprising at least one processor and at least one memory including computer program code, the at least one memory and the computer program code configured to, with the at least one processor, cause the apparatus to at least perform:

obtaining at least one first information indicative of audio data gathered by at least one first microphone (10*a*), and at least one second information indicative of audio data gathered by at least one second microphone (10*b*);

determining a differential information indicative of one or more differences between at least two pieces of information, wherein the differential information is determined based, at least in part, on the at least one first information and the at least one second information; and compensating of an impact onto the audio data, wherein audio data of the first information and/or the second information is compensated based, at least in part, on the determined differential information.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A speakerphone comprising:

a speakerphone housing;

a first microphone arranged in the speakerphone housing;

a second microphone arranged in the speakerphone housing, an output transducer arranged in the speakerphone housing;

a processor in communication with the first microphone, the second microphone and the output transducer, wherein the processor is configured to receive electrical signals from the first microphone and the second microphone, wherein the electrical signals represent ambient sound received by the first microphone and second microphone respectively;

a first calibration unit configured to receive the electrical signal from the first microphone, wherein the first calibration unit is configured to provide, based on the electrical signal from the first microphone, a first calibrated signal; and a second calibration unit configured to receive the electrical signal from the second microphone, wherein the second calibration unit is configured to provide, based on the electrical signal from the second microphone, a second calibrated signal;

wherein the processor is configured to establish a processed signal based on the first calibrated signal and the second calibrated signal; and wherein the output transducer is configured to output the processed signal as audio.

2. The speakerphone of claim 1, wherein processor is configured to determine a difference between the first calibrated signal and the second calibrated signal.

3. The speakerphone of claim 2, wherein the difference is determined by subtracting the first calibrated signal from the second calibrated signal, or by subtracting the second calibrated signal from the first filtered output signal.

4. The speakerphone of claim 1, wherein the processor is configured to substantially eliminate signal contributions from the output transducer in the processed signal.

5. The speakerphone of claim 1, wherein each of the first and second microphones has a bi-directional polar pattern.

6. The speakerphone of claim 1, wherein the output transducer is positioned substantially in a nulling plane of the respective bi-directional polar patterns of the first and second microphones.

7. A speakerphone of claim 1, wherein the processor is arranged in the speakerphone housing or in a remote device configured to be in wired or wireless communication with the speakerphone.

8. The speakerphone of claim 1, wherein the processor is configured to adjust one or more parameters based on a determined current aging state of at least one of the first microphone and the second microphone so that aging impacts causing alteration of audio data gathered by the at least one of the first microphone and the second microphone are compensated.

9. The speakerphone of claim 8, wherein current aging state includes or is a determination of a current degradation state.

10. The speakerphone of claim 1, wherein the first microphone, the second microphone and the output transducer are arranged on an axis or line when viewed from a top surface of the speakerphone housing.

11. The speakerphone of claim 1, wherein the output transducer is a loudspeaker.

12. The speakerphone of claim 1, wherein the first calibration unit and the second calibration unit comprise a first calibration and a second calibration circuit, respectively.

13. The speakerphone of claim 1, wherein the processor is arranged within the speakerphone housing.

14. The speakerphone of claim 1, wherein the processor is arranged in an external device in communication with the speakerphone.

15. An audio system, comprising:

a speakerphone comprising:

a speakerphone housing;

a first microphone arranged in the speakerphone housing;

a second microphone arranged in the speakerphone housing, an output transducer arranged in the speakerphone housing;

a processor in communication with the first microphone, the second microphone and the output transducer, wherein the processor is configured to receive electrical signals from the first microphone and the second microphone, wherein the electrical signals represent ambient sound received by the first microphone and second microphone respectively;

a first calibration unit configured to receive the electrical signal from the first microphone, wherein the first calibration unit is configured to provide, based on the electrical signal from the first microphone, a first calibrated signal; and a second calibration unit configured to receive the electrical signal from the second microphone, wherein the second calibration unit is configured to provide, based on the electrical signal from the second microphone, a second calibrated signal; and an external microphone configured to provide an external signal to the speakerphone;

wherein the processor is configured to establish a processed signal based on the first calibrated signal, the second calibrated signal, and the external signal; and wherein the output transducer is configured to output the processed signal as audio.

16. The audio system of claim 15, wherein the system is configured for cancelling at least one echo perceivable by a far-end user of the speakerphone.

* * * * *